(12) United States Patent
Saito et al.

(10) Patent No.: US 8,206,477 B2
(45) Date of Patent: Jun. 26, 2012

(54) LIQUID TRAP DEVICE FOR GAS

(75) Inventors: Takashi Saito, Miyagi (JP); Jun Ono, Kawasaki (JP); Takashi Yoshida, Miyagi (JP); Yoji Nakajima, Kakuda (JP)

(73) Assignee: Keihin Corporation, Tokyo (JP)

( * ) Notice: Subject to any disclaimer, the term of this patent is extended or adjusted under 35 U.S.C. 154(b) by 89 days.

(21) Appl. No.: 12/775,042

(22) Filed: May 6, 2010

(65) Prior Publication Data
US 2010/0269460 A1 Oct. 28, 2010

Related U.S. Application Data

(63) Continuation of application No. PCT/JP2008/068979, filed on Oct. 20, 2008.

(30) Foreign Application Priority Data

Nov. 7, 2007 (JP) .................................. 2007-289977

(51) Int. Cl.
*B01D 50/00* (2006.01)
(52) U.S. Cl. ........................................ 55/385.3; 55/486
(58) Field of Classification Search ................. 55/385.3, 55/476
See application file for complete search history.

(56) References Cited

U.S. PATENT DOCUMENTS

| | | | | |
|---|---|---|---|---|
| 1,463,990 | A | * | 8/1923 | Wilson .............................. 96/410 |
| 2,672,853 | A | * | 3/1954 | Dunnigan ................... 123/41.08 |
| 2,884,089 | A | | 7/1956 | Staley |
| 2004/0211181 | A1 | | 10/2004 | Fornof |

FOREIGN PATENT DOCUMENTS

| | | |
|---|---|---|
| DE | 196 45 666 A1 | 5/1998 |
| JP | 52-66111 A | 1/1977 |
| JP | 52-117715 | 9/1977 |
| JP | 53-117826 U | 9/1978 |
| JP | 59-127807 | 8/1984 |
| JP | 3-124950 A | 5/1991 |
| JP | 4-52517 U | 5/1992 |
| JP | 2000-205050 | 7/2000 |
| JP | 2006-312941 A | 11/2003 |
| JP | 2007-130558 A | 5/2007 |

* cited by examiner

*Primary Examiner* — Robert A Hopkins
(74) *Attorney, Agent, or Firm* — Arent Fox LLP (57) ABSTRACT

A liquid trap device for a gas is provided which includes a trap housing (3) that is formed from a ceiling wall (5), a bottom wall (6) and a peripheral wall (7), the ceiling wall (5) having provided therein a gas inlet port (20) and a gas outlet port (21), and a filter element (4) that is retained between the ceiling wall (5) and the bottom wall (6), the interior of the filter element (4) communicating with the gas inlet port (20) and the outer peripheral face of the filter element (4) communicating with the gas outlet port (21) via an internal space (8) of the trap housing (3), wherein the trap housing (3) is formed as a shape that in plan view is long along one laterally central line (X), and the filter element (4) and an outlet port upstream portion (21a), opening within the trap housing (3), of the gas outlet port (21) are disposed in proximity to first and second side wall portions (7a, 7b) respectively of the peripheral wall (7) facing each other on the laterally central line (X). This enables a liquid trap device for a gas to be provided in which a sufficient lateral distance from a filter element to a gas outlet can be guaranteed while having small dimensions and the performance in capturing a liquid can be enhanced.

4 Claims, 9 Drawing Sheets

LIQUID TRAP DEVICE FOR GAS

CROSS-REFERENCE TO RELATED APPLICATION

This application is a continuation of Application No. PCT/JP2008/068979, filed Oct. 20, 2008, which claims priority to Japanese Patent Application No. 2007-289977, filed Nov. 7, 2007. The disclosure of the prior application is hereby incorporated in its entirety by reference.

TECHNICAL FIELD

The present invention relates to an improvement of a liquid trap device for a gas, the device including a trap housing that is formed from a ceiling wall, a bottom wall opposite thereto, and a peripheral wall connecting the ceiling wall and the bottom wall, the ceiling wall having provided therein a gas inlet port and a gas outlet port, and a filter element that is retained between the ceiling wall and the bottom wall, the interior of the filter element communicating with the gas inlet port and the outer peripheral face of the filter element communicating with the gas outlet port via an internal space of the trap housing, and when gas flowing from the gas inlet port toward the gas outlet port passes through the filter element, a liquid contained in the gas is captured by the filter element.

BACKGROUND ART

In, for example, an automobile equipped with an engine employing natural gas as a fuel, a fuel tank storing compressed natural gas is mounted thereon, and when the engine is operating, high pressure gaseous fuel fed out from the fuel tank is reduced in pressure to a predetermined pressure and supplied to the engine. When compressed natural gas is stored in the fuel tank, lubricating oil within a compressor used for compressing the natural gas contaminates to a small extent the fuel that is compressed, and when gaseous fuel within the fuel tank is fed to the engine as fuel, it is necessary to capture the contaminating liquid from the gaseous fuel. The liquid trap device for a gas is used for capturing contaminating oil from a gas in such a situation, and is already known as disclosed in, for example, Patent Publication 1 below.
Patent Publication 1: Japanese Patent Application Laid-open No. 2007-130558

DISCLOSURE OF INVENTION

Problems to be Solved by the Invention

As one factor that degrades the performance of such a liquid trap device for a gas in capturing a liquid, a liquid that has been captured by the filter element and has exuded to its outer peripheral face is carried to a gas outlet by the flow of gas that has passed through the filter element. In order to prevent the performance in capturing a liquid from deteriorating, liquid that has been captured by the filter element, has exuded to its outer peripheral face, and is being carried by the flow of gas has to be made to fall before it reaches the gas outlet, and in order to do so it is important to guarantee a sufficient lateral distance from the filter element to the gas outlet. However, in a conventional liquid trap device for a gas, a trap housing is formed in a cylindrical shape that is substantially concentric with a filter element therewithin, and since a gas outlet is provided in an outer peripheral portion of an upper end wall of the trap housing, in order to guarantee a sufficient lateral distance from the filter element to the gas outlet it is necessary to form the trap housing with a sufficiently large diameter, and the dimensions of the liquid trap device for a gas inevitably increase.

The present invention has been accomplished in the light of such circumstances, and it is an object thereof to provide a liquid trap device for a gas for which a sufficient lateral distance from a filter element to a gas outlet can be guaranteed even while having small dimensions and the performance in capturing a liquid can be enhanced.

Means for Solving the Problems

In order to attain the above object, according to a first aspect of the present invention, there is provided a liquid trap device for a gas comprising a trap housing that is formed from a ceiling wall, a bottom wall opposite the ceiling wall, and a peripheral wall connecting the ceiling wall and the bottom wall, the ceiling wall having provided therein a gas inlet port and a gas outlet port, and a filter element that is retained between the ceiling wall and the bottom wall, an interior of the filter element communicating with the gas inlet port and an outer peripheral face of the filter element communicating with the gas outlet port via an internal space of the trap housing, characterized in that the filter element and an outlet port upstream portion, opening within the trap housing, of the gas outlet port are disposed in proximity to first and second side wall portions respectively of the peripheral wall facing each other on one laterally central line in plan view of the trap housing, and that when the internal space of the trap housing is divided into two areas by dividing the laterally central line into two equal parts, a central axis of the filter element and a central axis of the outlet port upstream portion are each disposed in the respective areas, an inlet port downstream portion, opening within the filter element, of the gas inlet port is formed as projecting into the filter element from a lower face of the ceiling wall to be an inflow guide tube, the outlet port upstream portion is formed as projecting into the internal space from the lower face of the ceiling wall to form an outflow guide tube, and a stagnant portion is defined around the outflow guide tube where gas becomes stagnant, and the ceiling wall, the peripheral wall, the inflow guide tube, and the outflow guide tube are integrally molded together with a synthetic resin as a material. Further it is characterized in that the trap housing is formed into a shape that is long along the laterally central line.

Effects of the Invention

In accordance with the first aspect of the present invention, since the filter element and the outflow guide tube are disposed in the vicinity to the first and second side wall portions respectively, which face each other on the laterally central line of the peripheral wall of the trap housing, the shape of the trap housing, which is long along the laterally central line, is efficiently utilized, and a sufficient distance between the filter element and the outflow guide tube can be guaranteed; even if liquid exuded from the filter element is carried by gas passing through the filter element, the liquid is separated from the gas and falls while the gas is moving the long distance to the gas outlet port, and it is possible to prevent the liquid from flowing out to the gas outlet port, thereby achieving a balance between a compact size for the trap housing and an improvement in the performance in capturing a liquid.

In accordance with the second aspect of the present invention, since the inflow guide tube projects into the filter element, gas that is guided into the filter element diffuses to the whole of the inside of the filter element and is filtered by the whole filter element; it is therefore possible to prevent local saturation of the filter element, the service time of the filter element can as a result be increased, the amount of liquid captured can be increased, and a contribution can be made to a further improvement in the performance in capturing a liquid.

Furthermore, since the inflow guide tube projects into the filter element, a large distance in the vertical direction between lower opening ends of the gas inlet port and the gas outlet port can be guaranteed, and this can promote separation and falling of liquid from the gas heading from the filter element to the gas outlet port, thus contributing to an improvement in the performance in capturing a liquid.

In accordance with the third aspect of the present invention, even if liquid attached to the peripheral wall of the trap housing is carried upward by the flow of gas, since a stagnant portion where gas becomes stagnant is present at the periphery of the outflow guide tube projecting downward from the ceiling wall, the flow of gas changes its direction so as to avoid the stagnant portion while leaving the liquid attached to the peripheral wall behind, and heads toward the outflow guide tube, the liquid attached to the peripheral wall is therefore prevented from reaching the outflow guide tube, it is possible to prevent it flowing out to the gas outlet port, and this can also contribute to an improvement in the performance in capturing a liquid.

EXPLANATION OF REFERENCE NUMERAL AND SYMBOLS

T Liquid trap device for a gas
X Laterally central line
3 Trap housing
4 Filter element
5 Ceiling wall
6 Bottom wall
7 Peripheral wall
7a First side wall portion
7b Second side wall portion
8 Internal space
20 Gas inlet port
20b Inlet port downstream portion
21 Gas outlet port
21a Outlet port upstream portion
22 Inflow guide tube
24 Outflow guide tube

BEST MODE FOR CARRYING OUT THE INVENTION

A mode for carrying out the present invention is explained below by reference to a preferred embodiment of the present invention shown in the attached drawings.

Embodiment 1

Figure 1:
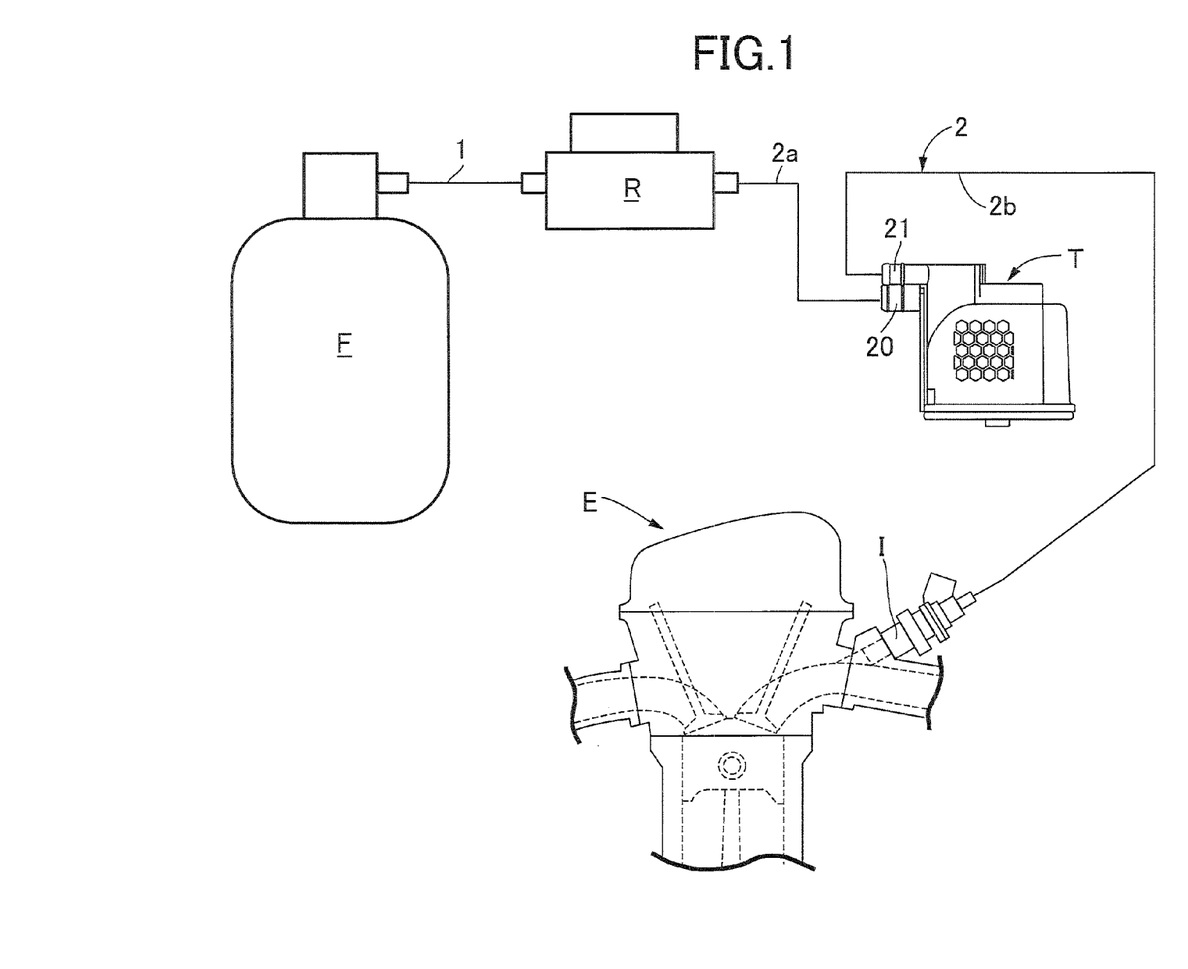
FIG. 1 is a diagram of a gaseous fuel supply system of an engine equipped with a liquid trap device for a gas related to an embodiment of the present invention. (first embodiment)

First, in FIG. 1, a fuel tank F stores compressed natural gas as a gaseous fuel. High pressure gaseous fuel within the fuel tank F is fed to a pressure regulator R through a high pressure guide tube 1 in order to reduce the pressure to a predetermined value. The pressure regulator R decreases the pressure of high pressure fuel thus fed to a predetermined pressure, and supplies it to a fuel injection valve I of an engine E through a low pressure guide tube 2, and in order to remove oil contaminating the gaseous fuel, a liquid trap device T for a gas is disposed partway along the low pressure guide tube 2.

The specific arrangement of the liquid trap device T for a gas is explained below in detail.

In FIG. 2 to FIG. 7, the liquid trap device T for a gas includes as main components a trap housing 3 and a cylindrical filter element 4 disposed within the trap housing 3. The trap housing 3 is formed from a ceiling wall 5, a bottom wall 6 opposite thereto, and a peripheral wall 7 connecting the ceiling wall 5 and the bottom wall 6. In the illustrated example, the ceiling wall 5 and the peripheral wall 7 are molded integrally using as a material a synthetic resin, and after the filter element 4 is inserted thereinto, the bottom wall 6, which is similarly formed from a synthetic resin, is ultrasonically welded to a lower end face of the peripheral wall 7.

Figure 8:
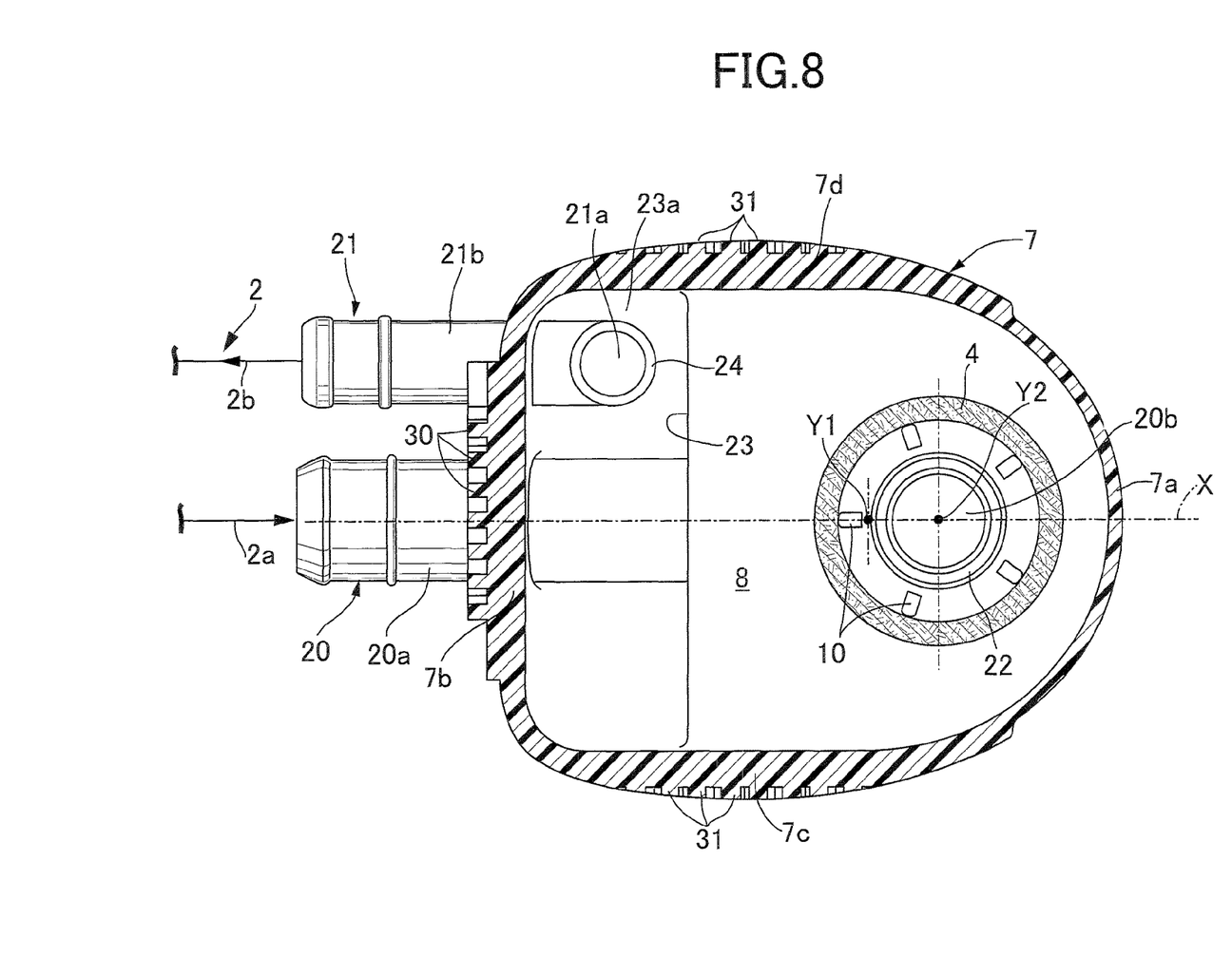
FIG. 8 is a sectional view along line 8-8 in FIG. 6. (first embodiment)

As shown in FIG. 8, the trap housing 3 is formed in a shape that in plan view extends long along one laterally central line X. In the peripheral wall 7 of this trap housing 3, two wall portions facing each other on the laterally central line X are called first and second side wall portions 7a and 7b, and two wall portions facing each other with the laterally central line X interposed therebetween are called third and fourth side wall portions 7c and 7d.

The first side wall portion 7a is formed in a semi-cylindrical shape having its central axis Y1 on the laterally central line X, the second side wall portion 7b is formed as a flat plate that is perpendicular to the laterally central line X, and the third and fourth side wall portions 7c and 7d are formed as flat plates perpendicular to the laterally central line X. In other words, the trap housing 3 has a shape in which in plan view one of the short sides of a rectangle having long sides along the laterally central line X is replaced by a semi-circle connecting the two long sides.

The cylindrical filter element 4 is disposed on an offset axis Y2 offset on the laterally central line X toward the semi-cylindrical first side wall portion 7a relative to the central axis Y1, and is retained between the ceiling wall 5 and the bottom wall 6. The retaining structure therefor is now explained.

Figure 6:
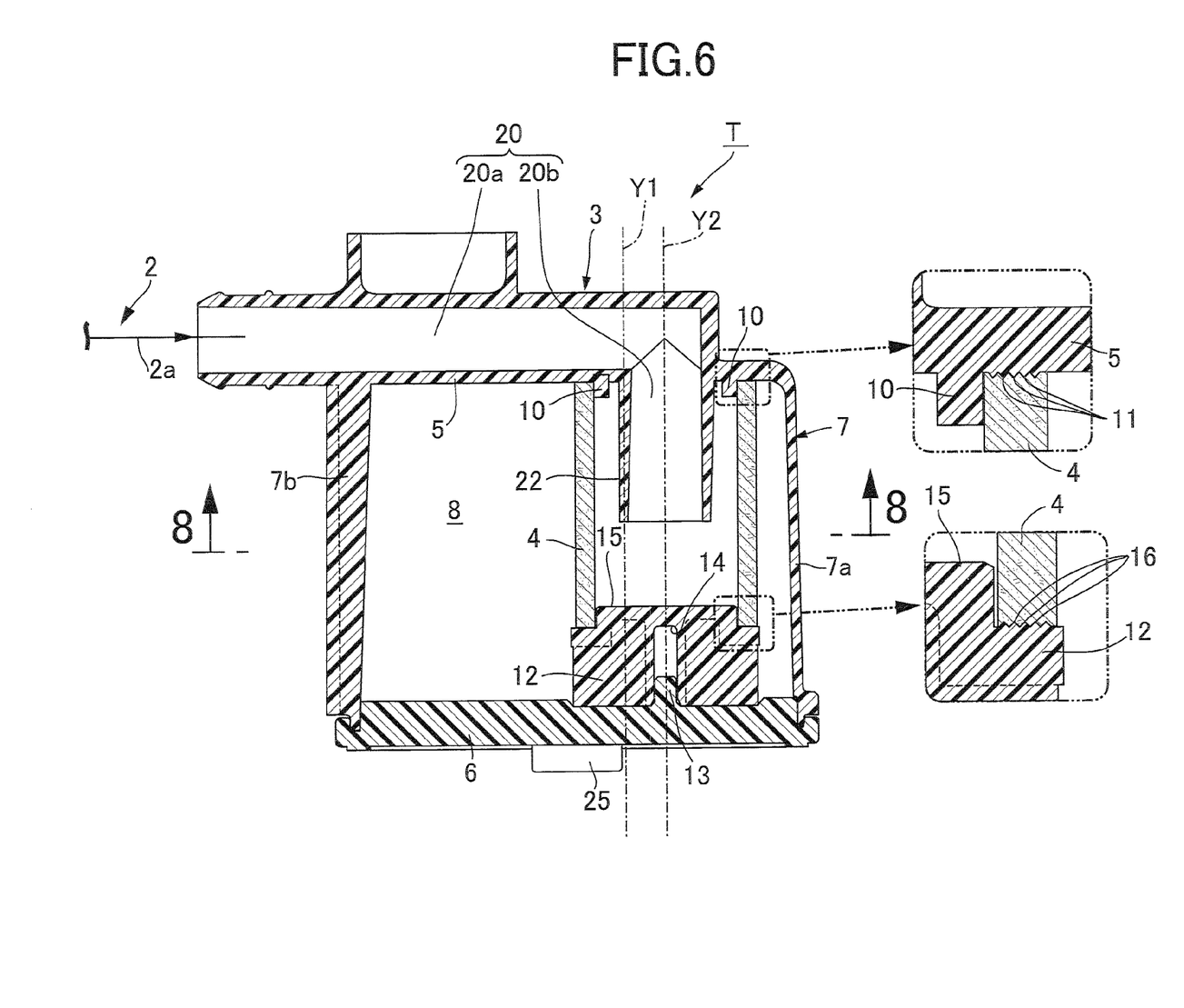
FIG. 6 is a sectional view along line 6-6 in FIG. 3. (first embodiment)

As shown in FIG. 6 and FIG. 8, formed on a lower face of the ceiling wall 5 are a plurality of upper positioning projections 10 arranged in an annular form around the offset axis Y2 and a plurality of annular upper sealing projections 11 surrounding these upper positioning projections 10, an inner face of an upper end part of the filter element 4 being fitted onto these upper positioning projections 10, and the upper sealing projections 11 biting into the filter element 4. The plurality of annularly arranged upper positioning projections 10 may be replaced by a continuous annular projection.

On the other hand, a support platform 12 is disposed on the bottom wall 6 so as to support the filter element 4 from below.

The bottom wall 6 and the support platform 12 are equipped with a positioning projection 13 and a positioning hole 14 respectively that are fitted together on the offset axis Y2, and the support platform 12 is positioned and retained on the offset axis Y2 by the fitting. Formed on an upper face of the support platform 12 are a circular lower positioning projection 15 with its center on the offset axis Y2 and a plurality of annular lower sealing projections 16 surrounding the lower positioning projection 15, the lower positioning projection 15 being fitted an inner peripheral face of a lower end part of the filter element 4 and the lower sealing projections 16 biting into the filter element 4. The cylindrical filter element 4 is thus supported by between the ceiling wall 5 and the bottom wall 6 on the offset axis Y2, and the air tightness of the upper and lower end faces of the filter element 4 is maintained.

Figure 7:
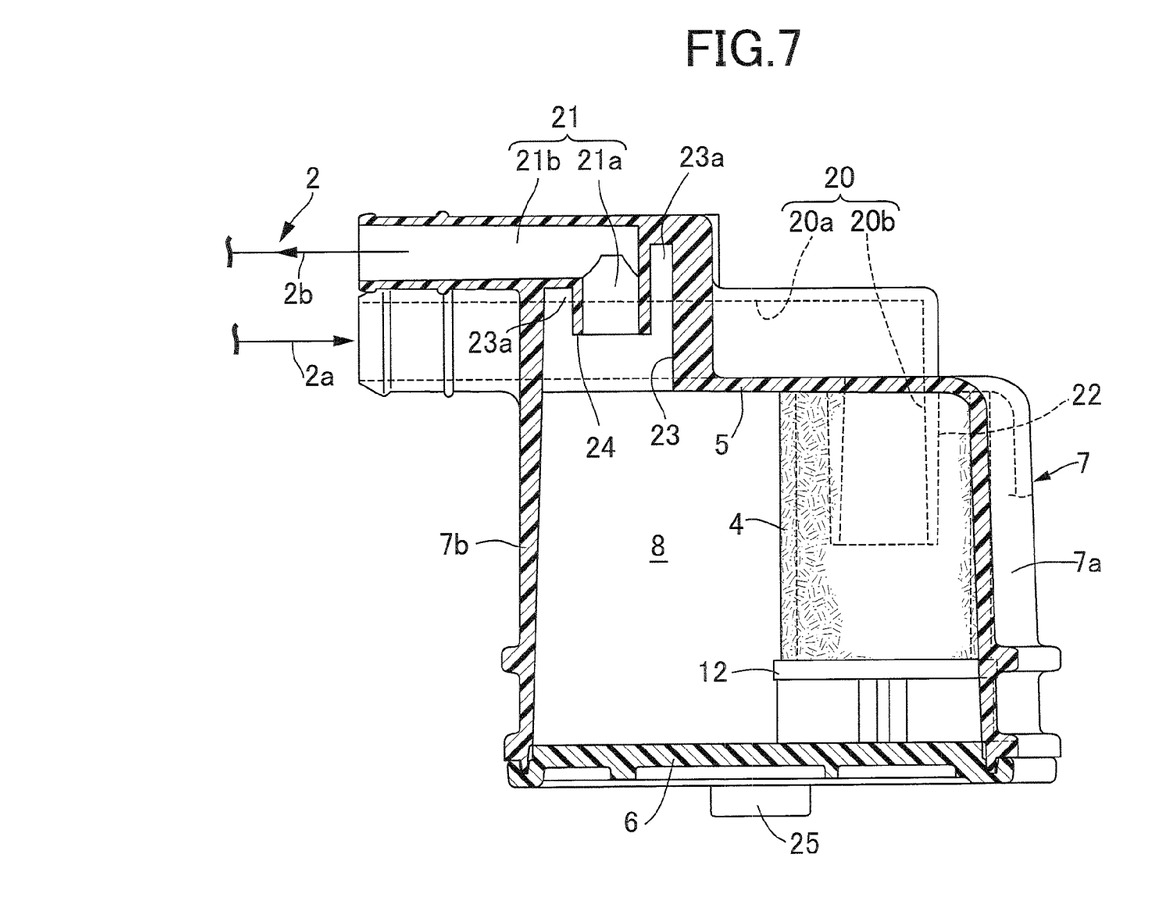
FIG. 7 is a sectional view along line 7-7 in FIG. 3. (first embodiment)

Referring now to FIG. 6 and FIG. 7, provided in the ceiling wall 5 are a gas inlet port 20 providing communication between an upstream side 2a of the low pressure guide tube 2 and the interior of the filter element 4 and a gas outlet port 21 providing communication between an internal space 8, around the filter element 4, of the trap housing 3 and a downstream side 2b of the low pressure guide tube 2. The gas inlet port 20 is formed from a horizontal inlet port upstream portion 20a that, in a plan view of the trap housing 3, is disposed on the laterally central line X (see FIG. 8) and has one end projecting outside the second side wall portion 7b, and an inlet port downstream portion 20b that is bent downward from the other end of the inlet port upstream portion 20a on the offset axis Y2 and projects into the filter element 4 from a lower face of the ceiling wall 5, and a portion of the inlet port downstream portion 20b that projects into the filter element 4 is defined as an inflow guide tube 22. The length of projection of this inflow guide tube 22 into the filter element 4 is desirably ½ or greater of the overall height of the filter element 4. The upstream side 2a of the low pressure guide tube 2 is connected to an outwardly projecting end of the inlet port upstream portion 20a.

The gas outlet port 21 is formed from a horizontal outlet port downstream portion 21b that is to one side and above the inlet port upstream portion 20a, extends in parallel to the inlet port upstream portion 20a, and has one end projecting outside the second side wall portion 7b, and an outlet port upstream portion 21a that is bent downward from the other end of the outlet port downstream portion 21b and projects into the internal space 8 of the trap housing 3 from a lower face of the ceiling wall 5, and a portion of the outlet port upstream portion 21a that projects from the lower face of the ceiling wall 5 is defined as an outflow guide tube 24. It should in particular be noted that the outlet port upstream portion 21a, that is, the outflow guide tube 24, is disposed within a recess 23 formed in the ceiling wall 5 in a corner surrounded by the flat plate-shaped second side wall portion 7b of the peripheral wall 7, and the similarly flat plate-shaped third side wall portion 7c or the fourth side wall portion 7d, and an open face at the lower end of the outflow guide tube 24 is positioned above an open lower face of the recess 23. By so doing, the lateral distance between the outflow guide tube 24 and the filter element 4 disposed in the vicinity of the first side wall portion 7a can be maximized within the trap housing 3. A portion of the recess 23 that surrounds the inflow guide tube 24 is defined as a stagnant portion 23a in which gas becomes stagnant.

Figure 5:
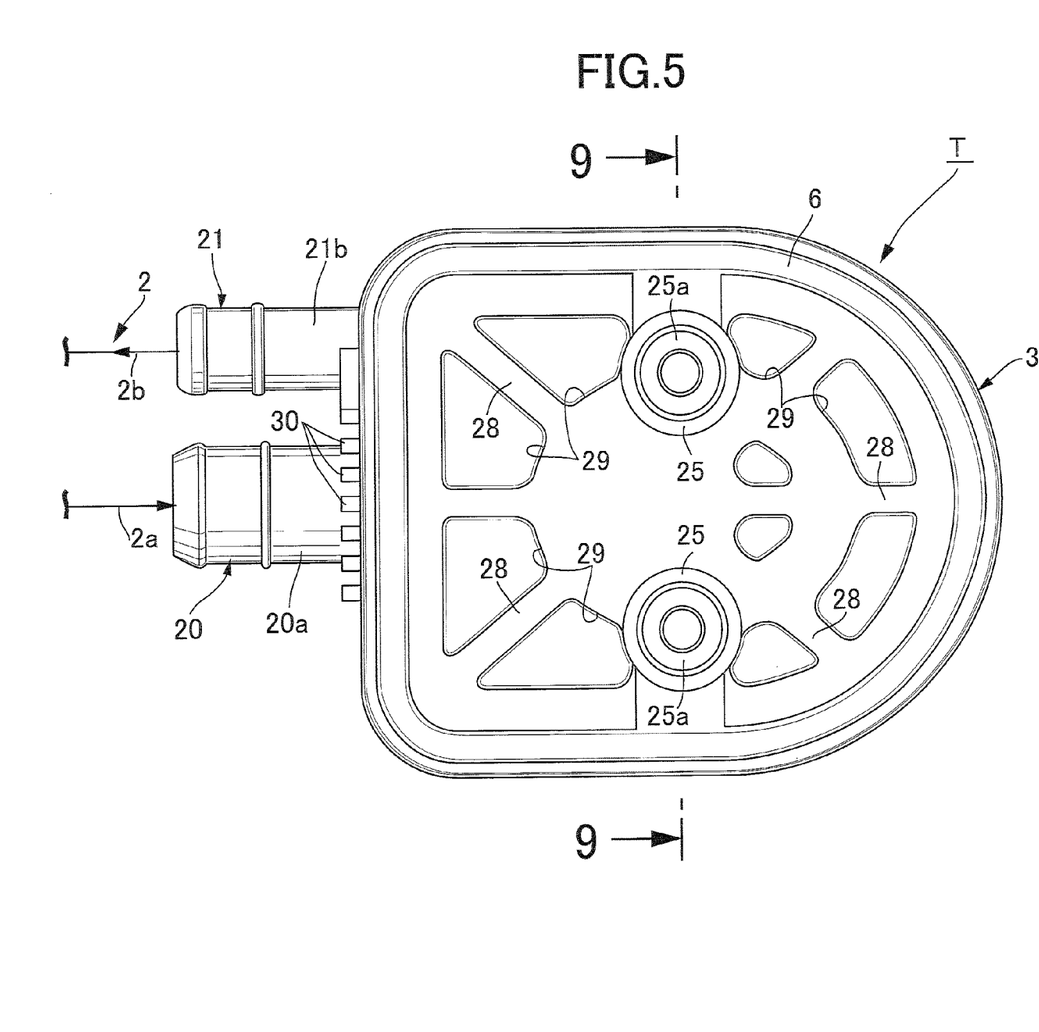
FIG. 5 is a view from arrow 5 in FIG. 2. (first embodiment)
Figure 9:
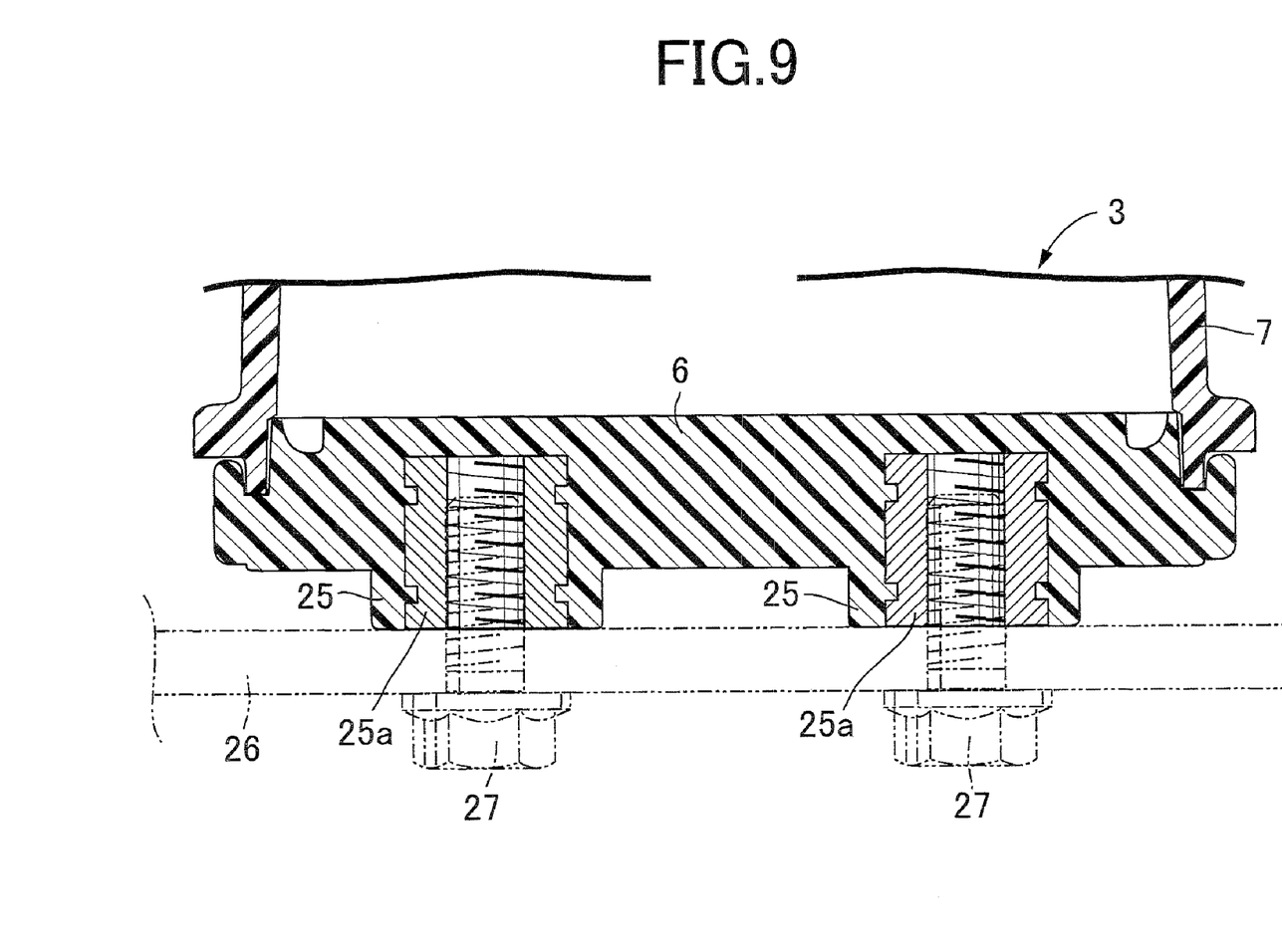
FIG. 9 is a sectional view along line 9-9 in FIG. 5. (first embodiment)

In FIG. 5 and FIG. 9, formed on the bottom wall 6 are a plurality of bosses 25 having a nut 25a embedded therein, and by fixing these bosses 25 to a bracket 26 by bolts 27 the trap housing 3 is supported on the bracket 26.

Figure 2:
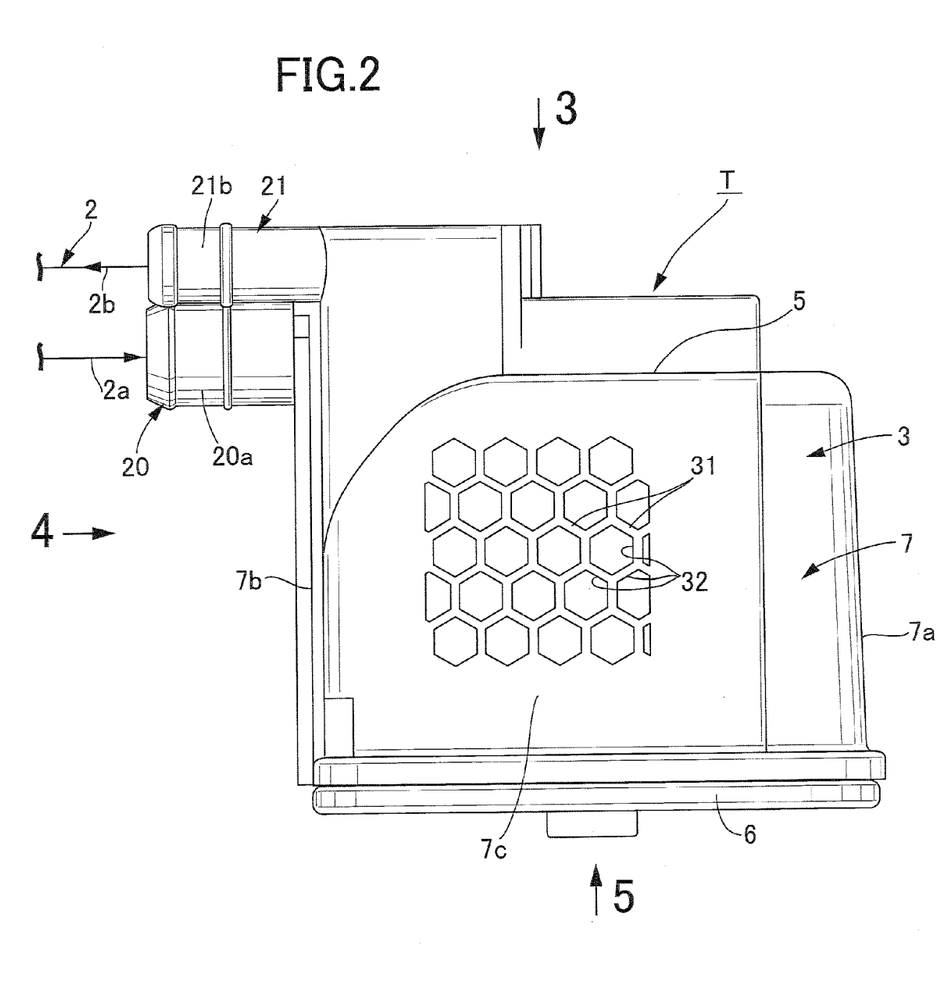
FIG. 2 is an enlarged side view of the liquid trap device for a gas. (first embodiment)
Figure 3:
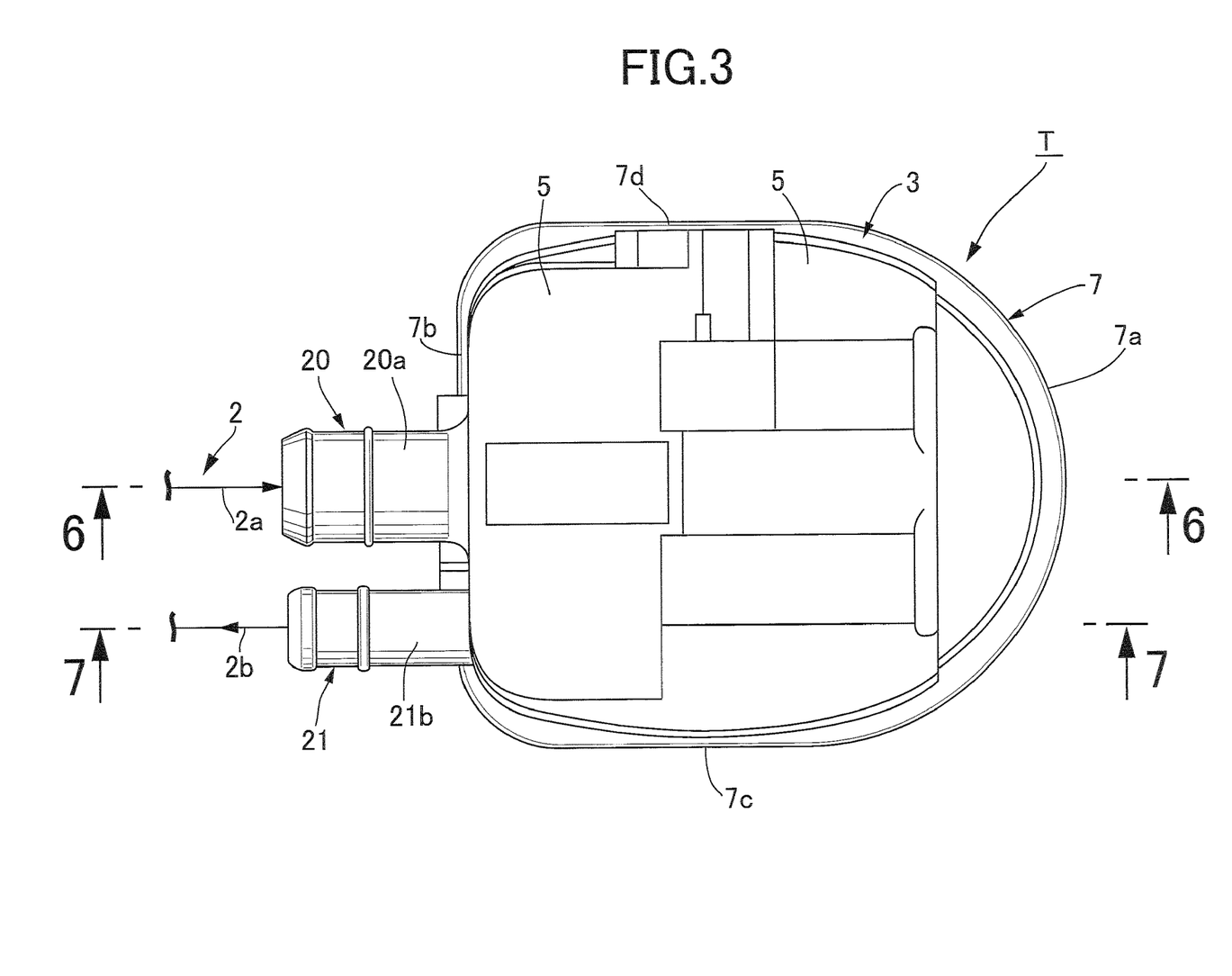
FIG. 3 is a view from arrow 3 in FIG. 2. (first embodiment)
Figure 4:
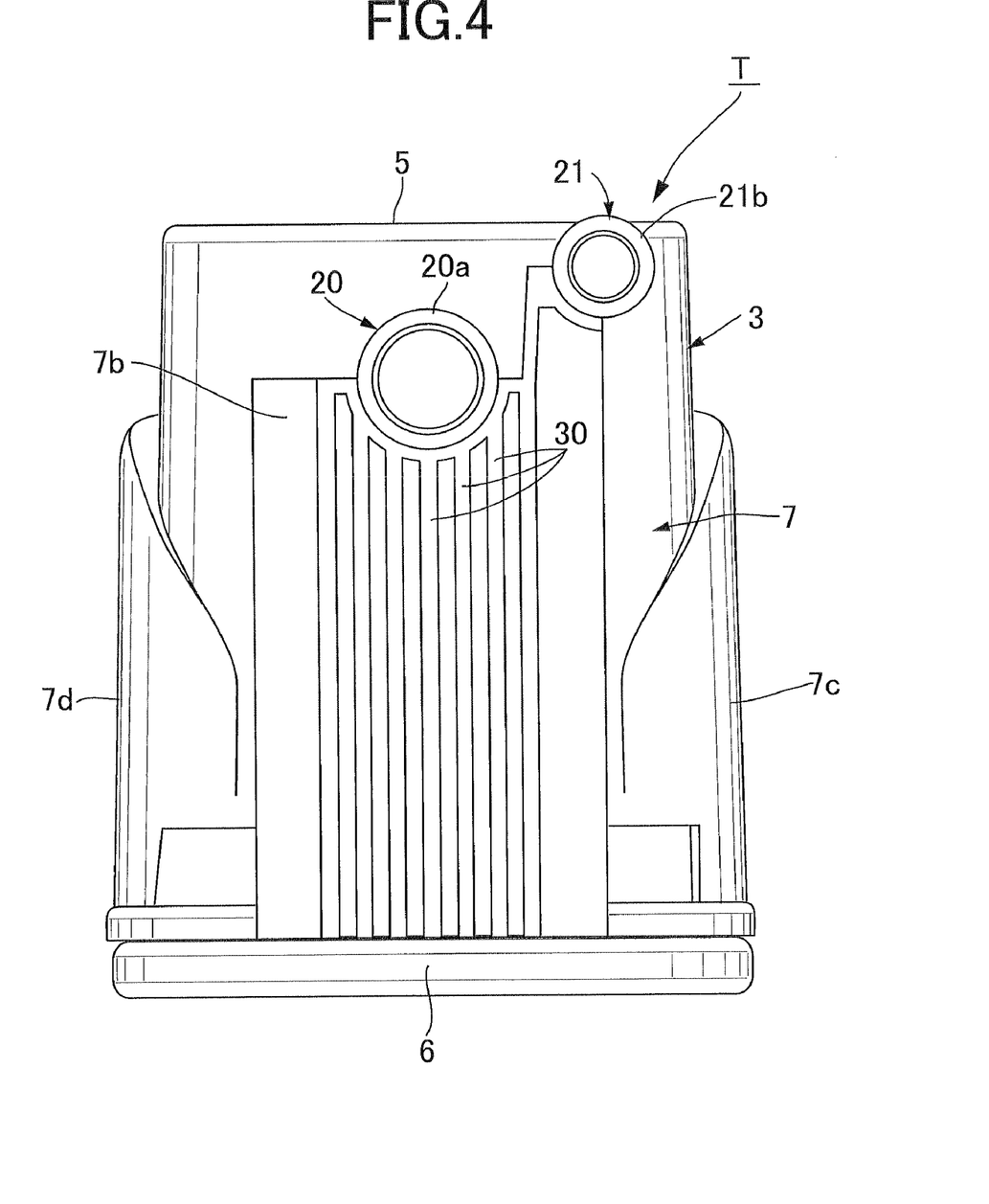
FIG. 4 is a view from arrow 4 in FIG. 2. (first embodiment)

A plurality of cutout recesses 29 are formed in a lower face of the bottom wall 6 so as to leave radial ribs 28. Furthermore, as shown in FIG. 4 and FIG. 8, a large number of vertically extending ribs 30 are formed on an outer face of the second side wall portion 7b of the peripheral wall 7. Moreover, as shown in FIG. 2 and FIG. 8, a plurality of cutout recesses 32 are formed in outer faces of the third and fourth side wall portions 7c and 7d so as to leave honeycomb-like ribs 31. These ribs 28, 30, and 31 and cutout recesses 29 and 32 enable both weight lightening and compressive strength of the trap housing 3 to be satisfied.

The operation of this embodiment is now explained.

When gaseous fuel that has been reduced in pressure down to a predetermined pressure by the pressure regulator R flows into the gas inlet port 20, the gaseous fuel is guided into the filter element 4 by the inflow guide tube 22 and filtered by the filter element 4. That is, contaminating oil in the gaseous fuel is captured by the filter element 4. Gaseous fuel that has been filtered by the filter element 4 passes from the outflow guide tube 24 through the gas outlet port 21 and the low pressure guide tube 2 and is injected via the fuel injection valve I of the engine E.

During this process, since the inflow guide tube 22 projects deeply into the filter element 4, gaseous fuel that has been guided into the filter element 4 diffuses to the whole of the interior of the filter element 4 and is filtered by the whole filter element 4; it is thus possible to prevent local saturation of the filter element 4, and as a result the service time of the filter element 4 can be prolonged.

Gaseous fuel that has been filtered by the filter element 4 heads toward the outflow guide tube 24 of the gas outlet port 21. The filter element 4 and the outflow guide tube 24 and are disposed close to the first and second side wall portions 7a and 7b respectively, which face each other on the laterally central line X, of the peripheral wall 7 of the trap housing 3; moreover, since the outflow guide tube 24 is disposed in a corner between the second side wall portion 7b and the third side wall portion 7c or the fourth side wall portion 7d, a sufficient distance between the filter element 4 and the outflow guide tube 24 can be guaranteed by efficiently utilizing the shape of the trap housing 3, which is formed long along the laterally central line X; even if oil that had exuded from the filter element 4 is carried by gaseous fuel that has passed through the filter element 4, the oil is separated from the gaseous fuel and falls while the gaseous fuel is traveling the long distance up to the outflow guide tube 24, and it is therefore possible to prevent oil from flowing out to the outflow guide tube 24. In this way, it is possible to achieve a balance between making the trap housing 3 compact and improving the performance in capturing a liquid.

Furthermore, since the inflow guide tube 22 projects deeply into the filter element 4 and the outflow guide tube 24 is disposed above the base of the inflow guide tube 22, it is also possible to guarantee a large distance in a vertical direction between lower opening ends of the inflow guide tube 22 and the outflow guide tube 24, and this also can promote separation and falling of oil from gaseous fuel that is heading from the filter element 4 toward the outflow guide tube 24, thus contributing to an improvement in the performance in capturing a liquid.

Oil might become attached to and detached from the peripheral wall 7 by gaseous fuel that is heading from the filter element 4 to the outflow guide tube 24 colliding with the peripheral wall 7. Even if the oil that has become attached to the peripheral wall 7 is carried upward by the constant flow of gaseous fuel heading toward the outflow guide tube 24, since the stagnant portion 23a, in which the gas becomes stagnant, is present around the outflow guide tube 24 projecting downward from the ceiling wall 5, the flow of gaseous fuel changes its direction so as to avoided the stagnant portion 23*a* and heads toward the outflow guide tube 24 while leaving the oil attached to the peripheral wall 7, thus preventing the oil attached to the peripheral wall 7 from reaching the outflow guide tube 24 and preventing the outflow thereof to the gas outlet port 21, thereby greatly contributing to an improvement in the performance in capturing a liquid.

Oil that has been separated from gaseous fuel and has fallen accumulates on an upper face of the bottom wall 6. Since the filter element 4 is supported by the support platform 12 placed on the bottom wall 6, the filter element 4 is not immersed in oil that has accumulated on the upper face of the bottom wall 6.

An embodiment of the present invention is explained above, but the present invention is not limited thereto and may be modified in a variety of ways as long as the modifications do not depart from the spirit and scope of the present invention.

The invention claimed is:

1. A liquid trap device for a gas comprising a trap housing that is formed from a ceiling wall, a bottom wall opposite the ceiling wall, and a peripheral wall connecting the ceiling wall and the bottom wall, the ceiling wall having provided therein a gas inlet port and a gas outlet port, the ceiling wall having an upwardly extending recess, and a tubular filter element that is retained between the ceiling wall and the bottom wall, an interior of the filter element directly communicating with the gas inlet port and an outer peripheral face of the filter element communicating with the gas outlet port via an internal space of the trap housing, wherein the filter element and an outlet port upstream portion, opening within the trap housing, of the gas outlet port are disposed in proximity to first and second side wall portions respectively of the peripheral wall facing each other on one laterally central line in plan view of the trap housing, wherein when the internal space of the trap housing is divided into two areas by dividing the laterally central line into two equal parts, a central axis of the filter element and a central axis of the outlet port upstream portion are each disposed in the respective areas, wherein an inlet port downstream portion, opening within the filter element, of the gas inlet port is formed as projecting into the filter element from a lower face of the ceiling wall defining an inflow guide tube, and wherein the outlet port upstream portion is formed as projecting into the recess in the ceiling wall above and adjacent the internal space.

2. The liquid trap device for a gas according to claim 1, wherein the trap housing is formed as a shape that is long along the laterally central line.

3. The liquid trap device for a gas according to claim 1, wherein the outlet port upstream portion defines an outflow guide tube having an open end in the recess and a volume around the outflow guide tube in the recess defining a stagnant portion where gas becomes stagnant.

4. The liquid trap device for a gas according to claim 3, wherein an open face at a lower end of the outflow guide tube is positioned above an open lower face of the recess.

* * * * *